United States Patent
Shimizu

(10) Patent No.: US 7,109,596 B2
(45) Date of Patent: Sep. 19, 2006

(54) VEHICLE DRIVE SYSTEM WITH GENERATOR CONTROL

(75) Inventor: Kouichi Shimizu, Sagamihara (JP)

(73) Assignee: Nissan Motor Co., Ltd., Yokohama (JP)

( * ) Notice: Subject to any disclaimer, the term of this patent is extended or adjusted under 35 U.S.C. 154(b) by 106 days.

(21) Appl. No.: 10/956,106

(22) Filed: Oct. 4, 2004

(65) Prior Publication Data
US 2005/0077731 A1    Apr. 14, 2005

(30) Foreign Application Priority Data
Oct. 8, 2003    (JP)    ............... 2003-348991

(51) Int. Cl.
*F02D 29/06*    (2006.01)

(52) U.S. Cl. ............... 290/40 C; 290/40 A; 290/40 B

(58) Field of Classification Search ............ 290/40 C, 290/40 B, 40 A
See application file for complete search history.

(56) References Cited

U.S. PATENT DOCUMENTS

| | | | |
|---|---|---|---|
| 5,150,045 A | | 9/1992 | Nagano et al. |
| 6,437,456 B1 * | | 8/2002 | Kimura et al. ............ 290/40 C |
| 6,469,402 B1 * | | 10/2002 | Morimoto et al. ........ 290/40 C |
| 6,617,703 B1 * | | 9/2003 | Matsubara et al. ....... 290/40 C |
| 6,661,109 B1 * | | 12/2003 | Fukasaku et al. ......... 290/40 C |
| 6,744,146 B1 * | | 6/2004 | Fulton et al. ............. 290/37 A |
| 6,823,954 B1 * | | 11/2004 | Shimabukuro et al. .... 180/65.2 |
| 6,856,035 B1 * | | 2/2005 | Brandon et al. .......... 290/40 C |

FOREIGN PATENT DOCUMENTS

| | | |
|---|---|---|
| JP | 3-169204 A | 7/1991 |
| JP | 4-150799 A | 5/1992 |
| JP | 10-94295 A | 4/1998 |
| JP | 2002-213592 A | 7/2002 |
| JP | 2002-235576 A | 8/2002 |
| JP | 2003-79004 A | 3/2003 |
| JP | 2003-193877 A | 7/2003 |

* cited by examiner

*Primary Examiner*—Darren Schuberg
*Assistant Examiner*—Iraj A. Mohandesi
(74) *Attorney, Agent, or Firm*—Global IP Counselors, LLP

(57) ABSTRACT

A vehicle drive system with a vehicle electric power generation control device is configured to prevent a drive belt between an engine and generator from slipping without causing the output of the generator from declining. When the target load torque Tg* of the generator is limited to the maximum transmittable torque value Tslip in order to prevent the belt from slipping, the engine rotational speed Ne and the generator rotational speed Ng are increased by downshifting the automatic transmission 4 to a lower gear ratio.

22 Claims, 12 Drawing Sheets

VEHICLE DRIVE SYSTEM WITH GENERATOR CONTROL

BACKGROUND OF THE INVENTION

1. Field of the Invention

The present invention generally relates to a vehicle drive system with generator control for a vehicle having an electric generator configured and arranged to generate electricity utilizing power delivered from an engine with a belt. The present invention also relates to a vehicle drive control device utilizing such a vehicle electric power generation control device.

2. Background Information

In recent years, hybrid four-wheel drive vehicles (hereinafter referred to as hybrid 4WD vehicles) have been developed in which the front wheels are driven by an engine and the rear wheels are driven by an electric motor, with the electric motor being driven by electric power generated by an electric generator driven by the engine. When an electric generator is driven with a belt, there is the possibility that the belt will slip if the load torque of the electric generator is large. If the belt slips, then the output of the electric generator will decline. The conventional approach to this problem has been to prevent the belt from slipping by limiting the load torque of the electric generator. One such invention is disclosed in the Japanese Laid-Open Patent Publication No. 2003-193877.

In view of the above, it will be apparent to those skilled in the art from this disclosure that there exists a need for an improved vehicle electric power generation control device. This invention addresses this need in the art as well as other needs, which will become apparent to those skilled in the art from this disclosure.

SUMMARY OF THE INVENTION

It has been discovered that the problem with preventing slippage of the belt by merely limiting the load torque of the electric generator as presented in the aforementioned patent publication is that the output of the electric generator will decline accordingly. The aforementioned patent publication also presents the idea of preventing belt slippage by limiting the engine torque. However, limiting the engine torque creates the additional problem of causing the drive force of the vehicle to decline.

Therefore, in view of these problems, one object of the present invention is to provide a vehicle drive system that prevents slippage of the belt that drives the electric generator without causing the output of the electric generator to decline.

In order to resolve the aforementioned problems, the present invention proposes a vehicle drive system that is configured to increase the rotational speed of the electric generator when the vehicle electric power generation control device limits the load torque imposed by the electric generator on the internal combustion engine in order to prevent the belt from slipping.

With the present invention, the rotational speed of the electric generator is increased when the load torque of the electric generator is limited. Thus, slippage of the belt can be prevented while suppressing the decline in the output of the electric generator.

In view of the foregoing, a vehicle drive system is provided that basically comprising a main drive source, an electric generator, a load torque limiting section and a rotational speed increasing section. The main drive source is arranged and configured to drive a first wheel. The electric generator is coupled to the main drive source by a drive belt such that the electric generator is configured and arranged to generate electric power using power transmitted thereto from the main drive source. The load torque limiting section is configured to selectively limit a load torque that the electric generator imposes on the main drive source to a value at which the drive belt does not slip. The rotational speed increasing section is configured to selectively increase a rotational speed of the electric generator when the load torque limiting section limits the load torque of the electric generator.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

FIRST EMBODIMENT

Figure 1:
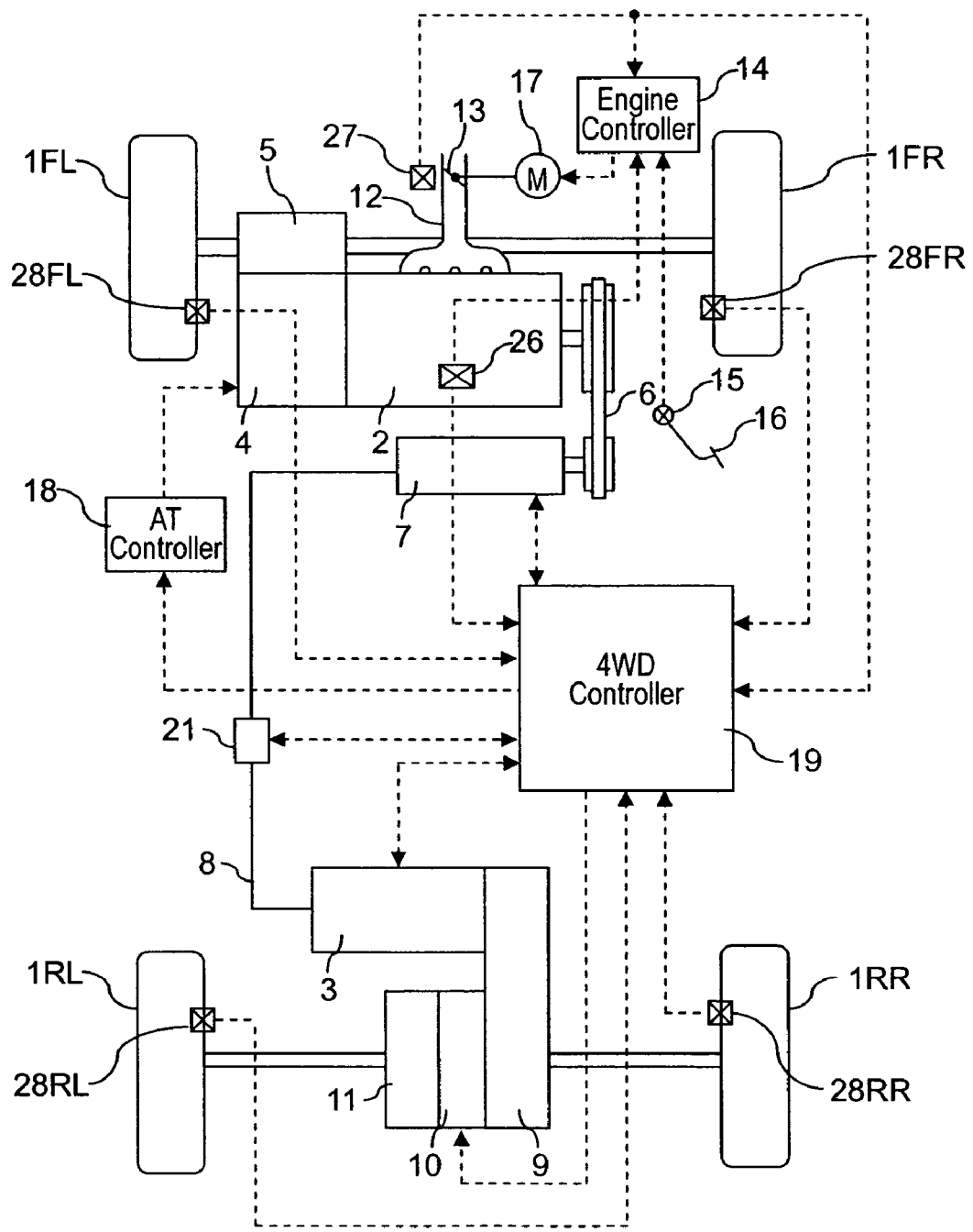
FIG. 1 is a schematic block diagram of a vehicle equipped with a vehicle drive system with generator control in accordance with a first embodiment of the present invention.

Referring initially to FIG. 1, a vehicle is schematically illustrated that is equipped with a vehicle drive system with generator control in accordance with a first embodiment of the present invention. The vehicle drive system is configured and arranged with a vehicle electric power generation control device as explained below.

As shown in FIG. 1, the vehicle in accordance with this embodiment has left and right front wheels 1FL and 1FR that are driven by an internal combustion engine or main drive source 2, and left and right rear wheels 1RL and 1RR that are driven by an electric motor or subordinate electric drive source 3, which is preferably a direct current (DC) electric motor. Thus, the vehicle is a so-called standby-type four-wheel drive vehicle in which the front wheels 1L and 1R serve as the main drive wheels, while the rear wheels 3L and 3R serve as the subordinate drive wheels.

Figure 14:
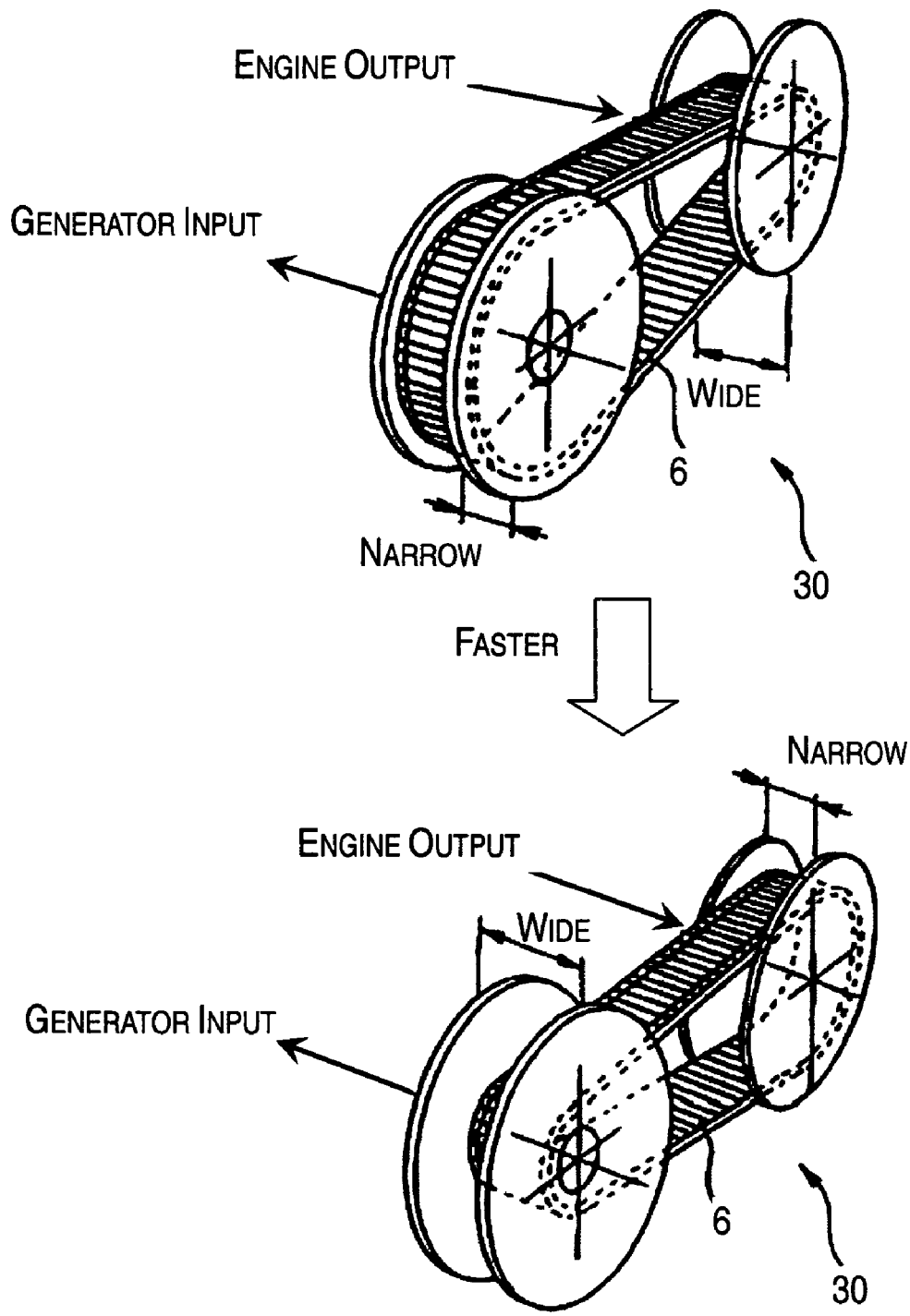
FIG. 14 is a schematic perspective view of a belt-driven continuously variable transmission (CVT) that is being adjusted to change the load torque of the generator on the engine.

The output of the engine 2 is transmitted to the front wheels 1FL and 1FR after passing successively through an automatic transmission 4 (transmission) equipped with a torque converter and a differential gear 5. An endless V-belt or drive belt 6 transfers power from the internal combustion engine 2 to an electric generator 7, which supplies electrical energy to the electric motor 3 as seen in FIGS. 1 and 14. The generator 7 utilizes the power transmitted thereto by the V-belt 6 to generate electric power and the generated electric power is delivered directly to the electric motor 3 through a power cable 8. The output of the electric motor 3 passes successively through a reduction gear 9, an electromagnetic clutch 10, and a differential gear 11 before being transmitted to the rear wheels 1RL and 1RR.

The output of the engine 2 is controlled by an engine controller 14 that is configured and arranged to adjust the opening of a throttle valve 13 that is provided in an air intake passage 12 (e.g., the intake manifold). The engine controller 14 adjusts the opening of the throttle valve 13 by controlling the rotational angle of a throttle motor 17 that is connected to the throttle valve 13. The engine controller 14 controls the opening of the throttle valve 13 in accordance with the amount by which the accelerator pedal 16 is depressed by the driver, which is detected by an accelerator sensor 15.

The gear ratio of the automatic transmission 4 is normally controlled by manual operation by the driver and automatic control by an AT controller 18 based on the vehicle speed and the accelerator pedal depression amount. The automatic transmission 4 can also be controlled by gear shift control commands issued to the AT controller 18 from a 4WD controller 19.

The 4WD controller 19 constitutes a vehicle electric power generation control device that preferably includes a microcomputer with a 4WD control program that is operatively coupled to the internal combustion engine 2, the electric motor 3, the generator 7 and the AT controller 18 to control the torque applied to the left and right front wheels 1L and 1R by the internal combustion engine 2, the torque applied to the left and right rear wheels 3L and 3R by an electric motor 3 and the load torque Tg of the generator 7 on the internal combustion engine 2 as discussed below. The 4WD controller 19 can also include other conventional components such as an input interface circuit, an output interface circuit, and storage devices such as a ROM (Read Only Memory) device and a RAM (Random Access Memory) device. It will be apparent to those skilled in the art from this disclosure that the precise structure and algorithms of the 4WD controller 19 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

Figure 2:
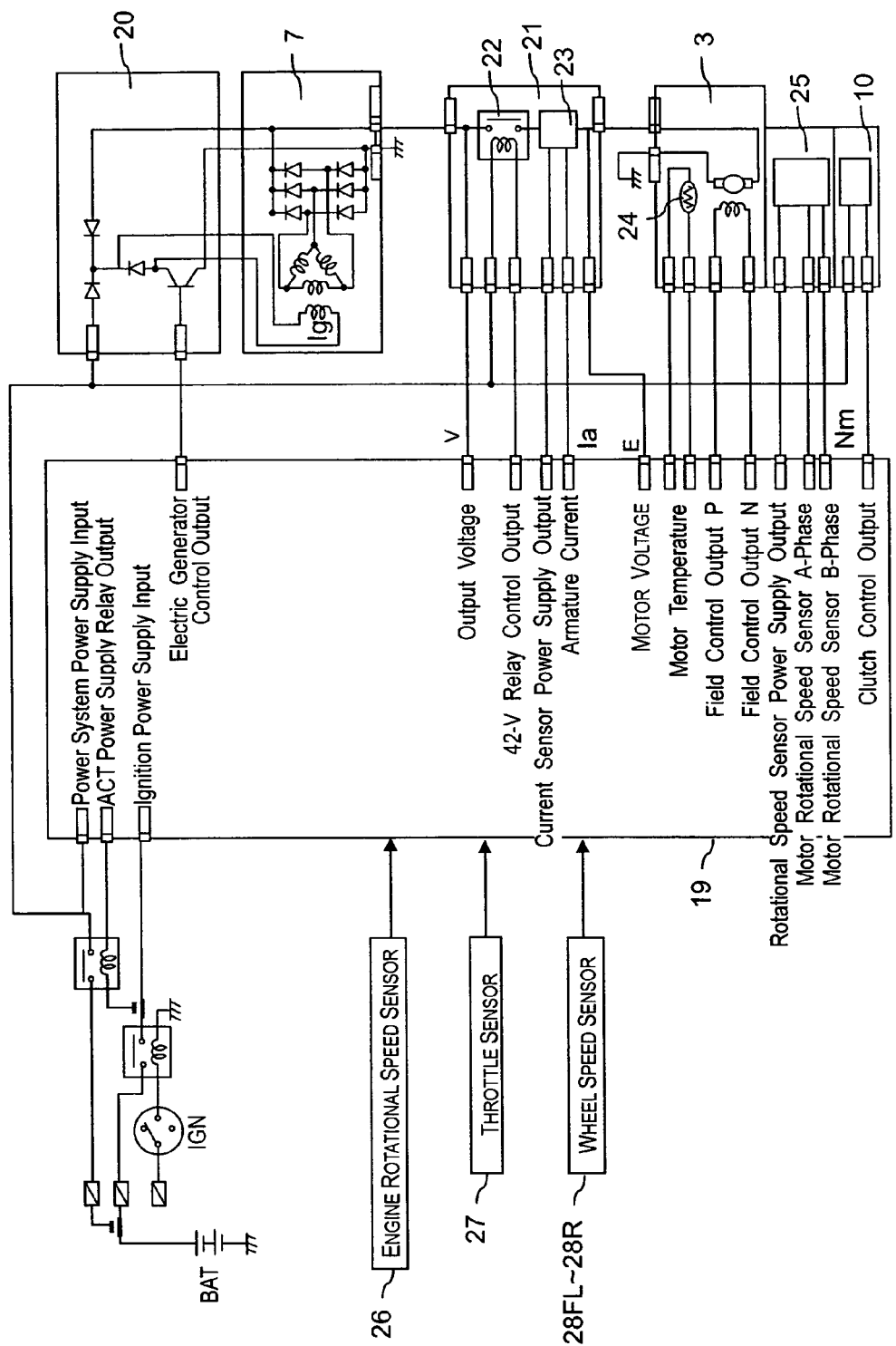
FIG. 2 is a block circuit diagram illustrating selected features for the vehicle electric power generation control device illustrated in FIG. 1 in accordance with the first embodiment of the present invention.

As shown in FIG. 2, the generator 7 is provided with a transistor-based regulator 20 for regulating the generator output voltage V. The regulator 20 controls the generator output voltage V of the generator 7 by adjusting the field current Ig according to a generator control command issued from the 4WD controller 19.

A main relay 22 and a current sensor 23 are provided inside a junction box 21 provided at an intermediate point along the power cable 8. The main relay 22 functions to turn on and off the supply of electric power to the electric motor 3 in accordance with a relay control command issued from the 4WD controller 19. The current sensor 23 detects the armature current Ia flowing to the electric motor 3 and reports the detected current value to the 4WD controller 19. A monitor circuit built into the junction box 21 detects the output voltage V of the generator 7 and the counter electromotive force or induced voltage E of the electric motor 3 and reports the detected values to the 4WD controller 19.

The drive torque Tm of the electric motor 3 is adjusted by controlling the field current Im of the electric motor 3 with a motor control command issued from the 4WD controller 19. The motor temperature and motor rotational speed Nm are detected by a thermistor 24 and a motor rotational speed sensor 25, respectively, that are built into the electric motor 3, and the detection signals of the sensors are fed to the 4WD controller 19.

The delivery of output from the electric motor 3 to the rear wheels 1RL and 1RR is controlled by the electromagnetic clutch 10 and the excitation current flowing through the electromagnetic clutch 10 is controlled by a clutch control command issued from the 4WD controller 19.

The 4WD controller 19 also receives detection signals from an engine rotational speed sensor 26 that detects the rotational speed Ne of the engine, a throttle sensor 27 that detects the opening degree θ of the throttle valve 13, and a pair of wheel speed sensors 28FL to 28 RR that detect the wheel speeds $V_{WFL}$ to $V_{WRR}$ of the wheels.

Figure 3:
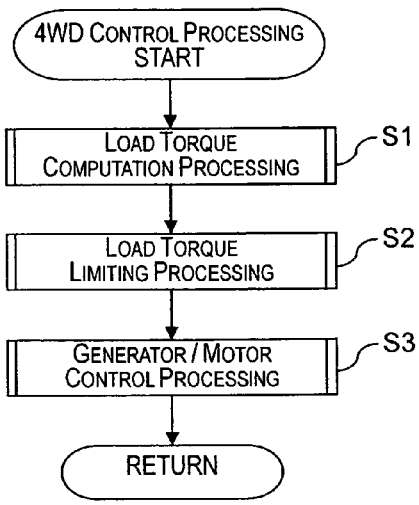
FIG. 3 is a flowchart illustrating the four-wheel drive control processing sequence executed by the vehicle electric power generation control device illustrated in FIG. 1 in accordance with the first embodiment of the present invention.

The four-wheel drive control executed by the 4WD controller 19 will now be described with reference to the flowchart shown in FIG. 3.

The four-wheel drive control sequence is executed once per prescribed time period (e.g., once every 10 msec). As shown in FIG. 3, steps S1, S2, and S3 are executed in sequential order. In the load torque computation processing of step S1, the 4WD controller 19 is configured to compute the target load torque Tg* of the generator 7 with respect to the engine 2. In the load torque limiting processing of step S2, the 4WD controller 19 is configured to limit the target load torque Tg*. In the generator/motor control processing of step S3, the 4WD controller 19 is configured to control the electric power generation of the generator 7 based on the target load torque Tg* and control the driving of the electric motor 3. During the drive control of the electric motor 3, the 4WD controller 19 operates the main relay 22 such that the electric power is supplied to the electric motor 3 and puts the electromagnetic clutch into the connected state.

The load torque computation processing of step S1 will now be described with reference to FIG. 4. In step S10, the 4WD controller 19 is configured to calculate the slippage velocity $\Delta VF$ of the main drive wheels, i.e., the front wheels 1FL and 1FR. The slippage velocity $\Delta VF$ is calculated by, for example, subtracting the average wheel speed of the rear wheels 1RL and 1RR from the average wheel speed of the front wheels 1FL and 1FR.

In step S11, the 4WD controller 19 is configured to determine if the slippage velocity $\Delta VF$ is greater than a prescribed value, such as 0. If $\Delta VF$ is determined to be less than or equal to 0, the front wheels 1FL and 1FR are determined not to be undergoing acceleration slippage and the 4WD controller 19 proceeds to step S112.

In step S12, the 4WD controller is configured to set the target load torque Tg* of the generator 7 with respect to the engine 2 to 0 and ends the load torque computation processing sequence.

Meanwhile, if $\Delta VF$ is found to be greater than 0 in step S11, then the 4WD controller 19 determines that the front wheels 1FL and 1FR are undergoing acceleration slippage and proceeds to step S13.

In step S13, the 4WD controller 19 calculates the load torque increase amount $\Delta Tg$ using the slippage velocity $\Delta VF$ in Equation (1) shown below:

$$\Delta Tg = K1 \Delta VF \quad (1)$$

The load torque increase amount $\Delta Tg$ is the amount by which the load torque of the generator 7 needs to be increased in order to alleviate the acceleration slippage of the front wheels 1FL and 1FR. K1 is a coefficient.

In step S14, the 4WD controller 19 calculates the load torque Tg of the generator 7 using Equation (2) shown below:

$$Tg = K2 \times V \times Ia/(K3 \times Ng) \quad (2)$$

In Equation (2), the term V is the output voltage of the generator 7, the term Ia is the armature current, the term Ng is the rotational speed of the generator 7, the term K2 is a coefficient, and the term K3 is an efficiency. The rotational speed Ng of the generator 7 is calculated by multiplying the engine rotational speed Ne by the pulley ratio.

Next, in step S15, the 4WD controller 19 calculates the load torque Tg* of the generator 7 with respect to the engine 2 using Equation (3) shown below:

$$Tg^* = Tg + \Delta Tg \quad (3)$$

Then, the 4WD controller 19 ends the load torque calculation processing sequence.

The load torque limiting processing of step S2 will now be described with respect to FIG. 5. In step S20, the 4WD controller 19 determines if the target torque Tg* is larger than the maximum load torque $Tg_{MAX}$ determined based on the capacity of the generator 7. If Tg is found to be larger than $Tg_{MAX}$, the 4WD controller 19 proceeds to step S21 where the 4WD controller 19 limits the target load torque Tg* to the maximum load torque $Tg_{MAX}$ before proceeding to step S22. Meanwhile, if Tg is found to be equal to or less than $Tg_{MAX}$, the 4WD controller 19 proceeds directly to step S22 without modifying the target load torque Tg*.

Figure 6:
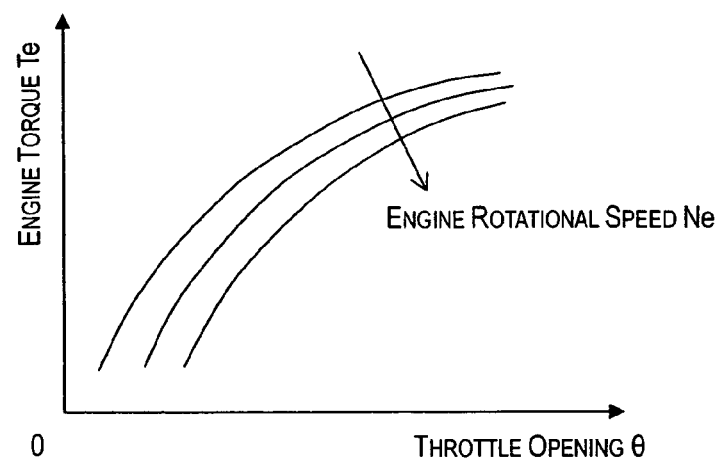
FIG. 6 is a control map used by the vehicle electric power generation control device to calculate the engine torque Te.

In step S22, the 4WD controller 19 refers to a map like that shown in FIG. 6 and finds the engine torque Te based on the engine rotational speed Ne and the throttle opening degree θ.

In step S23, the 4WD controller 19 calculates an allowable torque drop value Tdrop by which the engine torque Te can be decreased without stopping the engine 2 using the Equation (4) shown below.

$$T\text{drop} = Te - Te_{MIN} \quad (4)$$

In the Equation (4), the term $Te_{MIN}$ is the minimum engine torque required to keep the engine 2 running. The minimum engine running torque $Te_{MIN}$ can be calculated based on the engine rotational speed Ne or prepared in advance as a prescribed value.

In step S24, the 4WD controller S24 determines if the target load torque Tg* is larger than the allowable torque drop value Tdrop. If the target load torque Tg* is found to be larger than the allowable torque drop value Tdrop, the 4WD controller 19 proceeds to step S25 where it limits the target load torque Tg* to the allowable torque drop value Tdrop and proceeds to step S26. It is also acceptable to limit the target load torque Tg* to the value obtained by subtracting a prescribed value α from the allowable torque drop value Tdrop (Tdrop−α) in order to provide some leeway. Meanwhile, if the target load torque Tg is found to be equal to or smaller than the allowable torque drop value Tdrop, the 4WD controller 19 proceeds directly to step S26 without limiting the target load torque Tg*.

Figure 7:
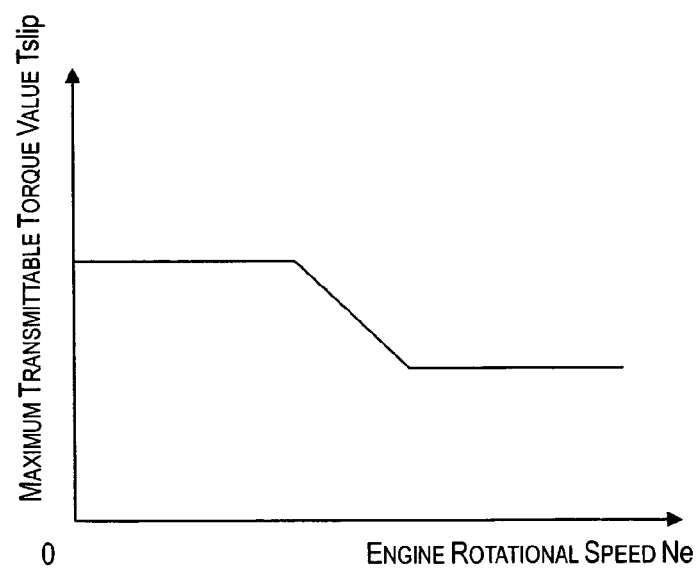
FIG. 7 is a control map used by the vehicle electric power generation control device to calculate the maximum transmittable torque value Tslip.

In step S26, the 4WD controller 19 refers to a map like that shown in FIG. 7 and calculates the maximum transmittable torque value Tslip at which the V-belt 6 will slip based on the engine rotational speed Ne. The control map shown in FIG. 7 is designed such that the maximum transmittable torque value Tslip becomes gradually smaller as the engine rotational speed Ne increases.

In step S27, the 4WD controller 19 determines if the target load torque Tg* is larger than the maximum transmittable torque value Tslip. If the target load torque Tg* is determined to be larger than the maximum transmittable torque value Tslip, then the 4WD controller 19 proceeds to step S28 where it limits the target load torque Tg* to the maximum transmittable torque value Tslip and proceeds to step S29.

In step S29, the 4WD controller 19 issues a gear shift control command to the AT controller 18 that instructs the AT controller 18 to downshift the automatic transmission 4 to a lower gear ratio and ends the load torque limiting processing sequence.

Meanwhile, if target load torque Tg* is found to be equal to or smaller than the maximum transmittable torque value Tslip in step S27, the 4WD controller 19 ends the load torque limiting processing sequence directly without limiting the target load torque Tg*.

The generator/motor control processing of step S3 will now be described with reference to FIG. 8. In step S30, the 4WD controller 19 determines if the slippage velocity $\Delta VF$ is greater than 0. If the slippage velocity $\Delta VF$ is found to be equal to or less than 0, the 4WD controller 19 determines that the front wheels 1FL and 1FR are not undergoing acceleration slippage and ends the generator/motor control processing sequence directly.

If the slippage velocity ΔVF is found to be greater than 0 in step S30, the 4WD controller 19 determines that the front wheels 1FL and 1FR are undergoing acceleration slippage and proceeds to step S31.

In step S31, the 4WD controller 19 refers to a control map like that shown in the flowchart and calculates the target motor field current Im* based on the motor rotational speed Nm. The target field current Im* is controlled using a well-known weak field control method so as to become smaller as the motor rotational speed Nm reaches a high speed region. More specifically, since the motor torque Tm tends to decline due to increased induced voltage when the electric motor 3 rotates at a high speed, the 4WD controller 19 reduces the field current Im in order to suppress the increase in the induced voltage and prevent the motor torque Tm from declining.

In step S32, the 4WD controller 19 issues a motor control command to the electric motor 3 instructing the electric motor 3 to adjust the field current Im to the target field current Im*.

In step S33, the 4WD controller 19 calculates the target motor torque Tm* based on the target load torque Tg*.

In step S34, the 4WD controller 19 refers to a control map like that shown in the flowchart and calculates the target armature current Ia* based on the target motor torque Tm* and target field current Im* of the electric motor 3.

In step S35, the 4WD controller 19 refers to a control map like that shown in the flowchart and calculates the induced voltage E of the electric motor 3 based on the target field current Im* and the motor rotational speed Nm.

In step S36, the 4WD controller 19 calculates the target voltage V* to be generated by the generator 7 using the equation (5) shown below.

$$V^* = Ia^* \times R \times E \quad (5)$$

In the equation, the term R is the combined resistance of the power cable 9 and the coil of the electric motor 3.

In step S37, the 4WD controller 19 issues a generator control command to the regulator 20 instructing the regulator 20 to adjust the field current Ig of the generator 7 so as to match the output voltage V of the generator 7 to the target voltage V*. Then the 4WD controller 19 ends the generator/motor control processing sequence.

Figure 4:
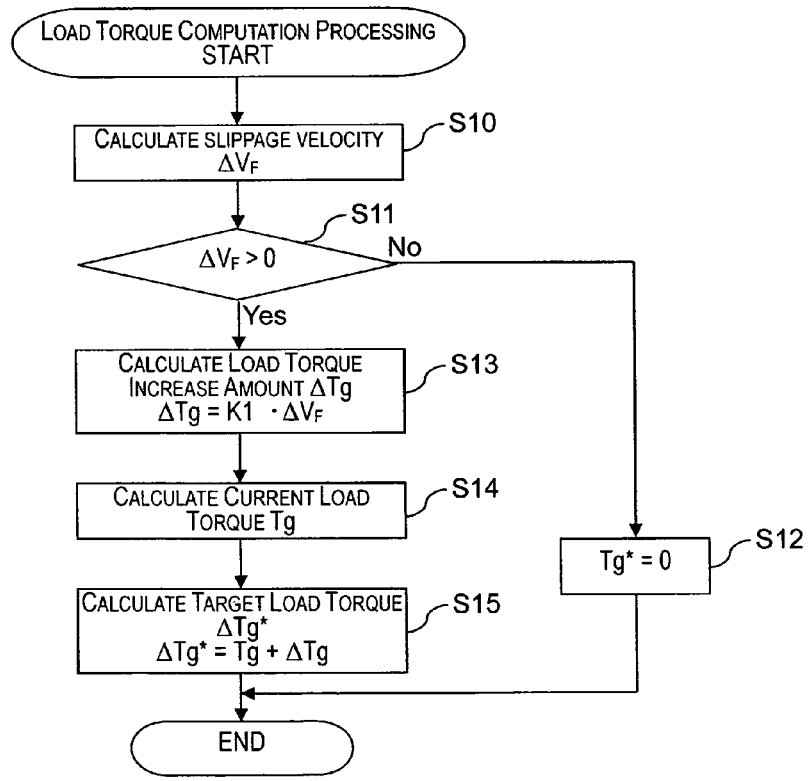
FIG. 4 is a flowchart illustrating the load torque computation processing executed by the vehicle electric power generation control device illustrated in FIG. 1 in accordance with the first embodiment of the present invention.
Figure 5:
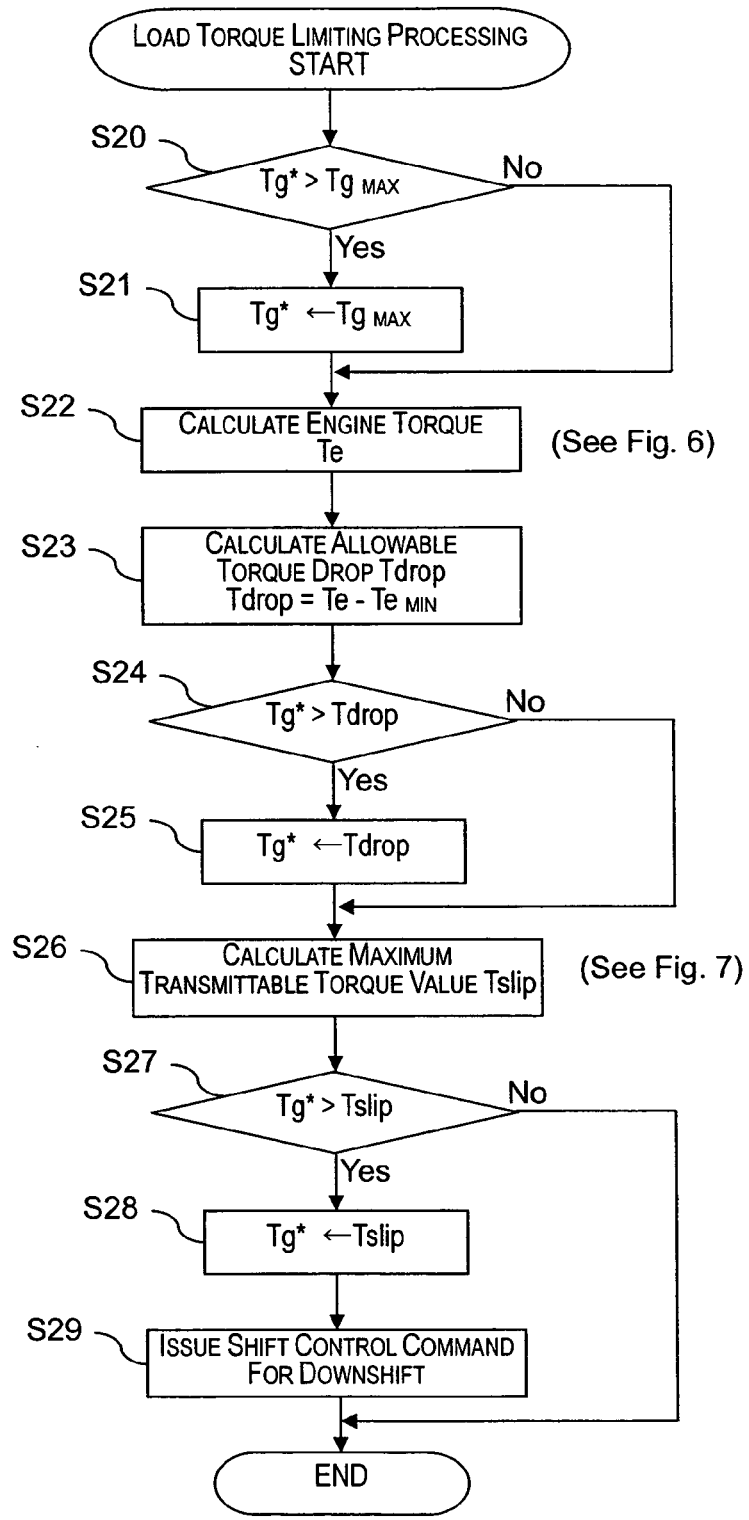
FIG. 5 is a flowchart illustrating the load torque limiting processing executed by the vehicle electric power generation control device illustrated in FIG. 1 in accordance with the first embodiment of the present invention.
Figure 8:
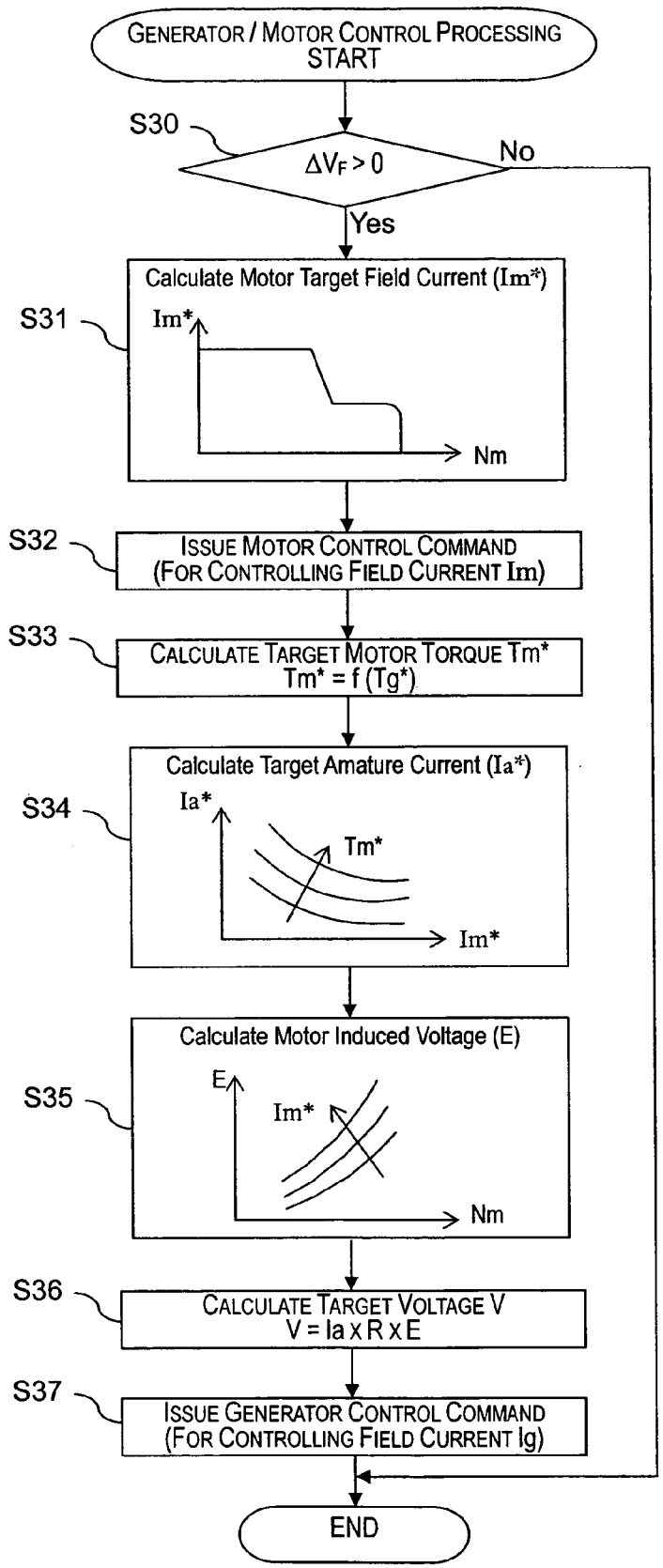
FIG. 8 is a flowchart illustrating the generator/motor control.

The processing of steps S10 to S15 of FIG. 4 and the processing of steps S33 to S37 of FIG. 8 constitutes a load torque control section, the processing of steps S27 and S28 of FIG. 5 constitutes a load torque limiting section, and the processing of step S29 of FIG. 5 constitutes a rotational speed increasing section.

The operation and effects of the first embodiment will now be explained. For the purposes of the explanation, consider a situation in which the accelerator pedal 16 has been suddenly depressed to a large degree or that the coefficient of friction of the road surface is low due to rain, snow, or ice and, consequently, the front wheels 1FL and 1FR driven by the engine 2 are undergoing acceleration slippage. When this occurs, the target load torque Tg* to be imposed on the engine 2 by the generator 7 is calculated in accordance with the slippage velocity ΔVF of the front wheels 1FL and 1FR (steps S13 to S15) and the generator 7 begins generating electricity based on the target load torque Tg* (steps S33 to S35). In this way, by converting the rotational energy that would otherwise be lost due to acceleration slippage into electric energy, the output of the engine 2 is held down and the acceleration slippage of the front wheels 1FL and 1FR can be suppressed.

The electric power generated by the generator 7 is delivered to the electric motor 3 such that the electric motor 3 drives the rear wheels 1RL and 1RR (steps S31 and S32). Thus, in addition to improving the energy efficiency, this control device enables the vehicle to demonstrate smoother and more stable acceleration and driving performance.

By limiting the target load torque Tg* of the generator 7 to the maximum transmittable torque value Tslip (steps S27 and S28), the V-belt 6 can be reliably prevented from slipping when the generator 7 is generating electricity using power transmitted thereto by the V-belt 6.

Figure 9:
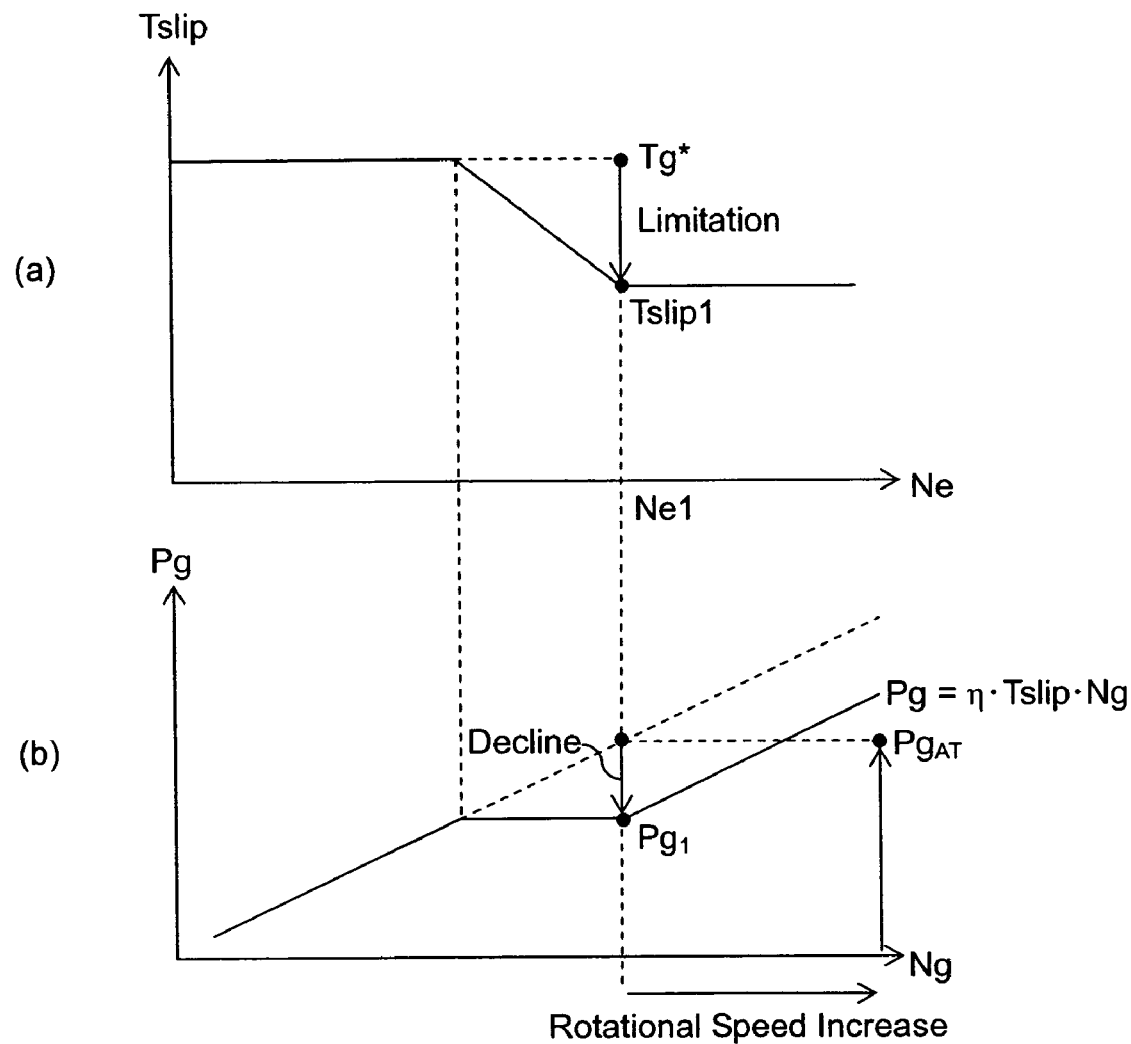
FIG. 9 are graphs illustrating the operational effects of the vehicle electric power generation control device in accordance with the first embodiment of the present invention.

The output Pg of the generator 7 is expressed as the product of the electric power generation efficiency η, the generator rotational speed Ng, and the load torque Tg (Pg=η×Ng×Tg). Therefore, if the target load torque Tg* is limited to the maximum transmittable torque value Tslip1 when the engine rotational speed is Ne1 as shown in diagram (a) of FIG. 9, the generator output Pg will decrease to Pg1 as shown in diagram (b) of FIG. 9.

In this embodiment, when the target load torque Tg* is limited to the maximum transmittable torque value Tslip1, the automatic transmission 4 is downshifted to a lower gear ratio (step S29) so as to increase the engine rotational speed Ne and the generator rotational speed Ng.

As a result, in addition to preventing the V-belt 6 from slipping, a generator output $Pg_{AT}$ can also be obtained which is substantially equal to the generator output Pg that would be obtained if the target load torque Tg* was not limited to the maximum transmittable torque value Tslip1. This result occurs due to the following relationship: Pg=η×Ng×Tg. Thus, by reliably preventing the output of the generator 7 from declining, the output of the electric motor 3 can be prevented from declining and the stability of the four-wheel drive can be improved.

Although in the first embodiment the maximum transmittable torque value Tslip is calculated based on the engine rotational speed Ne, the invention is not limited to such an approach. For example, it is also acceptable to calculate the maximum transmittable torque Tslip based on the vehicle speed.

Although, in the first embodiment, a conventional automatic transmission 4 is used as the transmission, the invention is not limited to such a transmission. It is also acceptable to use a belt-driven continuously variable transmission or toroidal continuously variable transmission. If a continuously variable transmission is used, the generator rotational speed Ng can be increased in a more fine adjusted manner when the target load torque Tg* is limited to the maximum transmittable torque value Tslip and, thus, the output Pg of the generator 7 can be optimized.

Although, in the first embodiment, the electric power generation of the generator 7 is controlled by adjusting the field current Ig based on the target voltage V*, the invention is not limited to such an approach. For example, it is also acceptable to calculate the generator field current Ig by multiplying the difference ΔIa between the target armature current Ia* and the actual armature current Ia by a proportional gain and control the electric power generation of the generator 7 based on a duty cycle calculated in accordance with the generator field current Ig.

Although, in the first embodiment, the electric power generated by the generator 7 is delivered exclusively to the electric motor 3, the invention is not limited to such an arrangement. It is also acceptable for the generated electric power to be delivered to other electrical devices such as the battery, the spark ignition system, the starter, or the air conditioning system.

Although, in the first embodiment, the generator 7 is only started and used to drive the rear wheels 1RL and 1RR when the front wheels 1FL and 1FR undergo acceleration slippage, the invention is not limited to such an arrangement. It is also acceptable to start the generator 7 and use the generated electric power to drive the rear wheels 1RL and 1RR in response to another criterion, such as the accelerator pedal being depressed beyond a prescribed position, even when the front wheels 1FL and 1FR are not undergoing acceleration slippage.

Although, in the first embodiment, the front wheels 1FL and 1FR are the main drive wheels driven by the engine 2 and the rear wheels 1RL and 1RR are the auxiliary drive wheels arranged and configured such that they can be driven by the electric motor 3, the invention is not limited to such an arrangement. It is also acceptable for the rear wheels 1RL and 1RR to be the main drive wheels and the front wheels 1FL and 1FR to be the auxiliary drive wheels.

Although, in the first embodiment, the invention is applied to a four-wheeled vehicle, it is also feasible to apply the invention to a vehicle having a different number of wheels, such as a two-wheeled vehicle or a three-wheeled vehicle.

SECOND EMBODIMENT

Figure 10:
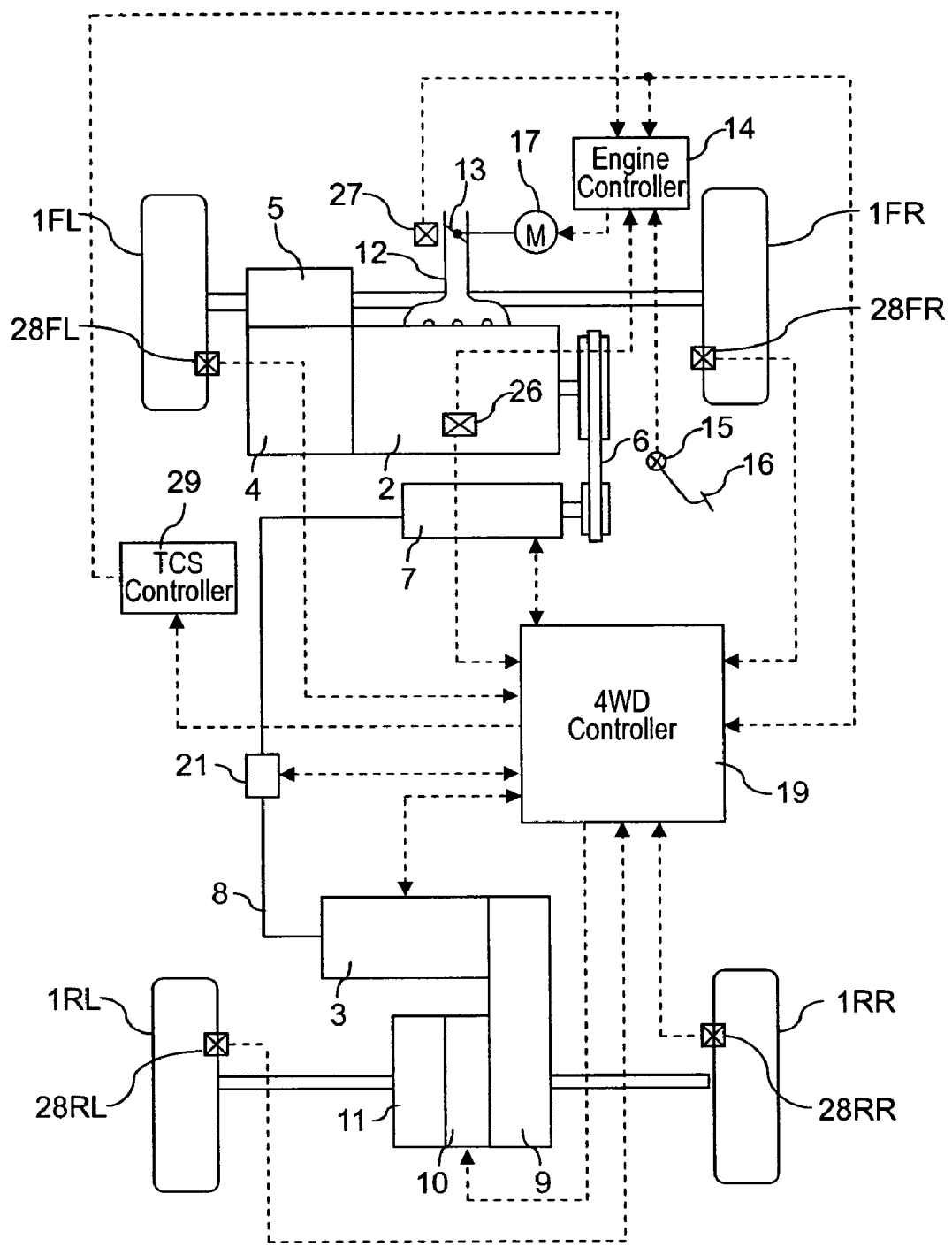
FIG. 10 is a schematic block diagram of a vehicle equipped with a vehicle electric power generation control device in accordance with a second embodiment of the present invention.

A second embodiment of the present invention will now be described with reference to FIGS. 10 to 12. The second embodiment is generally the same as the first embodiment, except that it presents a different method of increasing the rotational speed Ng of the generator when the target load torque Tg* is limited to the maximum transmittable torque value Tslip. As shown in FIG. 10, the general constituent features of the second embodiment are the same as those of the first embodiment (shown in FIG. 1) except that the AT controller 18 has been replaced by a TCS controller 29. Parts that are identical to the parts shown in FIG. 1 are indicated with the same reference numerals and descriptions thereof may be omitted for the sake of brevity.

The TCS controller 29 executes traction control that ignores operation of the accelerator by the driver and limits the output of the engine 2 in such a manner that the acceleration slippage ratio S (degree of slippage) of the front wheels 1FL and 1FR matches a target acceleration slippage ratio S* outputted from the 4WD controller 19. More specifically, the TCS controller 29 communicates with the engine controller 14 to limit the output of the engine 2 by controlling the throttle opening and fuel delivery of the engine 2.

Figure 11:
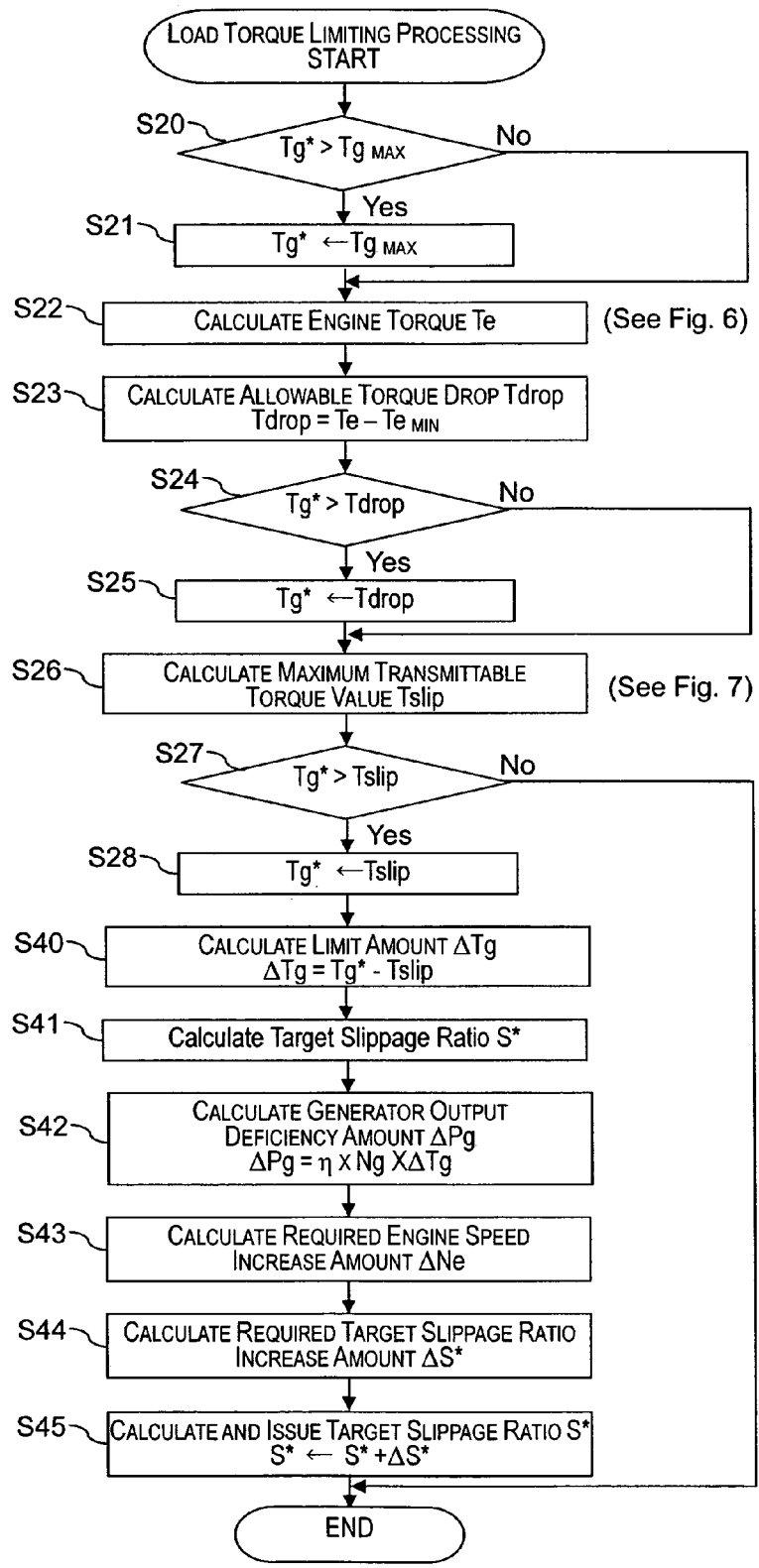
FIG. 11 is a flowchart illustrating the load torque limiting processing executed by the vehicle electric power generation control device illustrated in FIG. 10 in accordance with the second embodiment of the present invention.

As shown in FIG. 11, the load torque limiting processing of the second embodiment is the same as the load torque limiting processing shown in FIG. 5 except that step S29 has been replaced with the new steps S40 to S45. The steps that are the same as those shown in FIG. 5 are indicated with the same step numbers and descriptions thereof may be omitted for the sake of brevity.

In step S40, the 4WD controller 19 uses the Equation (6) shown below to calculate the limit amount $\Delta Tg$ required to limit target load torque Tg* to the maximum transmittable torque value Tslip.

$$\Delta Tg = Tg^* - Tslip \quad (6)$$

In step S41, the 4WD controller 19 calculates the basic target slippage ratio S* to be sent to the TCS controller 29 based on the limit amount $\Delta Tg$.

In step S42, the 4WD controller 19 uses the Equation (7) shown below to calculate the deficiency amount $\Delta Pg$ by which the generator output will be insufficient due to the limiting of the target load torque Tg*.

$$\Delta Pg = \eta \times Ng \times \Delta Tg \quad (7)$$

In step S43, the 4WD controller 19 calculates the increase amount $\Delta Ne$ by which the engine rotational speed needs to be increased in order to compensate for the output deficiency amount $\Delta Pg$ of the generator 7; the calculation is based on the output deficiency amount $\Delta Pg$.

In step S44, the 4WD controller 19 calculates the increase amount $\Delta S^*$ by which the target slippage ratio S* needs to be increased in order to increase the engine rotational speed by the amount $\Delta Ne$; the calculation is based on the increase amount $\Delta Ne$.

In step S45, the 4WD controller 19 adds the increase amount $\Delta S^*$ calculated in step S44 to the target slippage ratio S* calculated in step S41 to calculate the final target slippage ratio S* and sends the final target slippage ratio S* to the TCS controller 29 before ending the load torque limiting processing sequence.

The processing of steps S40 and S41 of FIG. 11 constitutes a traction control section and the processing of steps S42 to S45 constitutes a rotational speed increasing section.

The operation and effects of the second embodiment will now be described.

For the purposes of the explanation, consider a situation in which the target load torque Tg* of the generator 7 has been limited to the maximum transmittable torque value Tslip (step S28) but the engine output cannot be suppressed by an amount corresponding to the amount by which the target load torque Tg* was limited (reduced). By setting the target slippage ratio S* of the traction control in accordance with the amount $\Delta Tg$ by which the target load torque was limited (reduced) (steps S40 and S41), the amount by which the engine output cannot be suppressed due to the operation of the generator 7 is compensated for with traction control and the output of the engine 2 is reliably suppressed in accordance with the target load torque Tg* that was in effect before the target load torque was limited to the maximum transmittable torque value Tslip. As a result the stability of the vehicle can be ensured.

Figure 12:
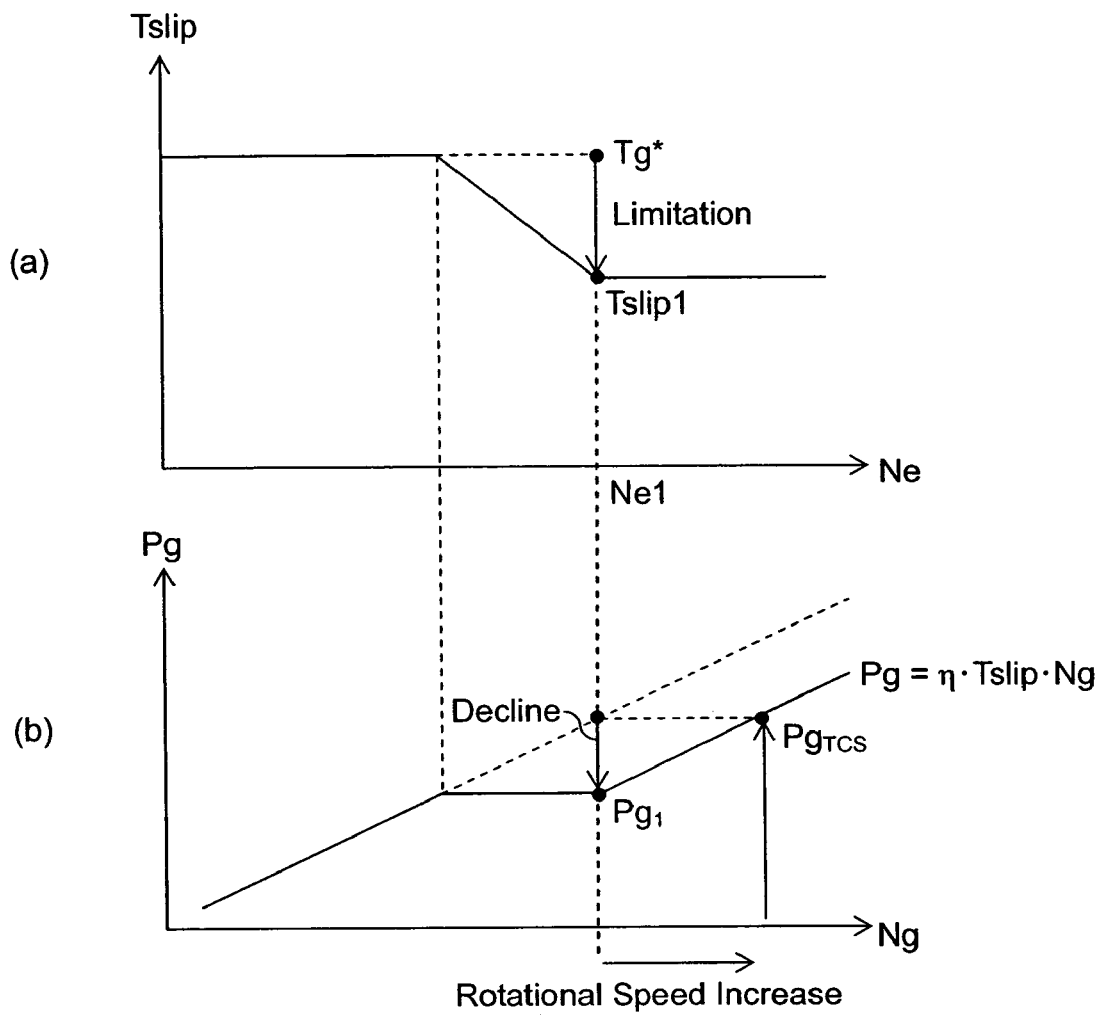
FIG. 12 are graphs illustrating the operational effects of the vehicle electric power generation control device in accordance with the second embodiment of the present invention.

Similarly to the first embodiment, if the target load torque Tg* is limited to the maximum transmittable torque value Tslip1 as shown in diagram (a) of FIG. 12, the generator output Pg will decrease to Pg1 as shown in diagram (b) of FIG. 12. Therefore, when the 4WD controller 19 limits the target load torque Tg* to the maximum transmittable torque value Tslip 1, it increases the engine rotational speed Ne and the generator rotational speed Ng by increasing the target slippage ratio S* sent to the TCS controller 29, thereby reducing the amount by which the output of the engine 2 is limited (steps S42 to S45).

As a result, in addition to reliably preventing the belt from slipping, a generator output $Pg_{TCS}$ can be obtained that is substantially equal to the generator output Pg that would have been obtained if the target load torque Tg* had not been limited to the maximum transmittable torque value Tslip1. Since the amount by which the engine output is limited can be reduced freely to the desired degree by adjusting the target slippage ratio S*, the output Pg of the generator 7 can be optimized.

Otherwise, the operational effects of the second embodiment are the same as those of the first embodiment.

Although in the second embodiment the traction control is executed only when the target load torque Tg* is limited to the permissible torque upper limit value Tslip, the invention is not limited to such an arrangement. It is also acceptable to execute the traction control when the target load torque Tg* is limited to a maximum load torque $Tg_{MAX}$ determined based on the capacity of the generator 7. Furthermore, it is also acceptable to execute the traction control constantly on a "normally on" basis. In this latter case, acceleration slippage of the wheel(s) can be suppressed speedily by using traction control and the electric power generated by the generator 7.

Although in the second embodiment the target slippage ratio S* is increased in accordance with the limit amount ΔTg when the target load torque Tg* is limited to the maximum transmittable torque Tslip, the invention is not limited to such an arrangement. For example, it is also acceptable to increase the normal target slippage ratio (e.g., S*=10%) to a prescribed larger value (e.g., S*=20%).

THIRD EMBODIMENT

Figure 13:
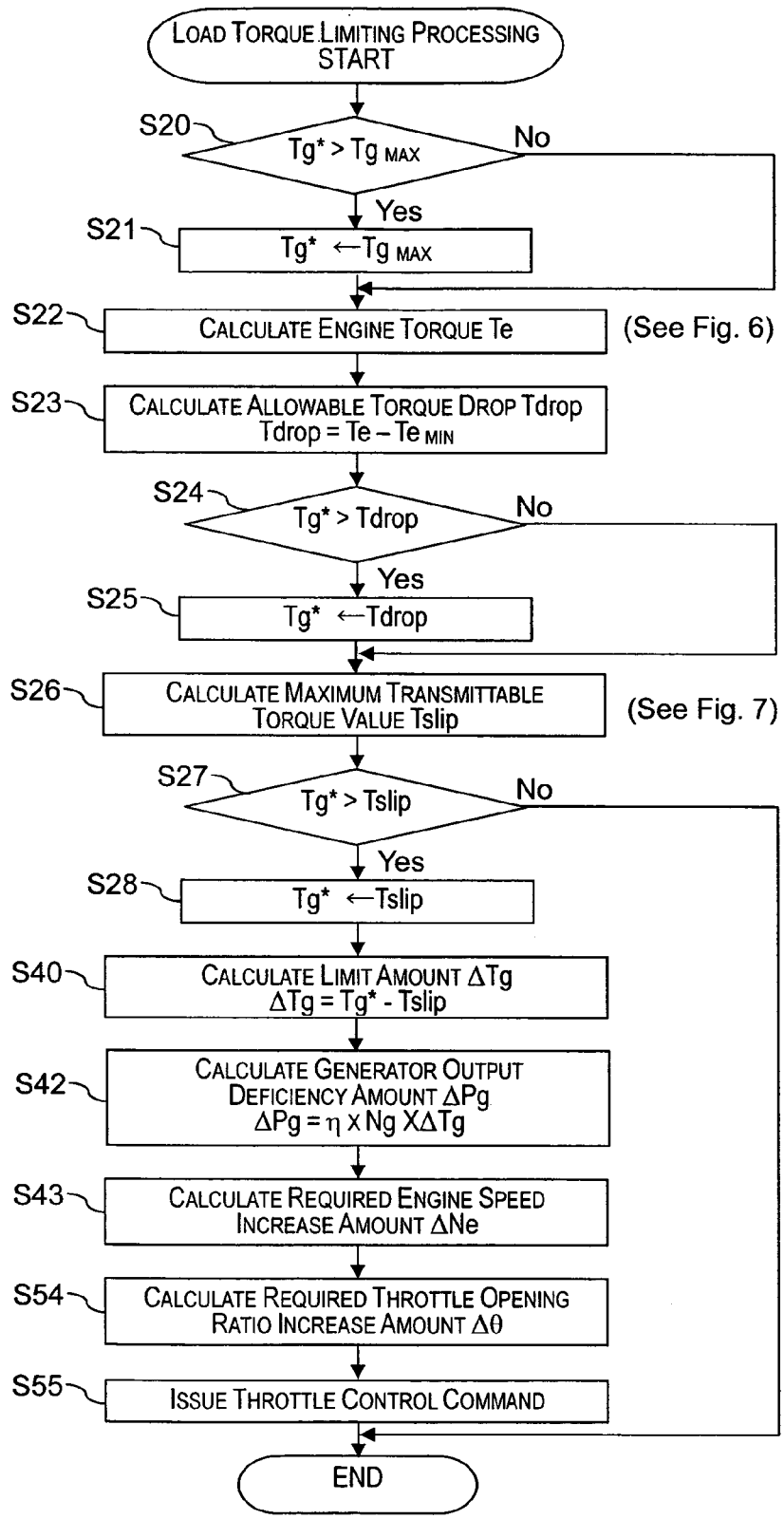
FIG. 13 is a flowchart illustrating the load torque limiting processing executed by the vehicle electric power generation control device in accordance with a third embodiment of the present invention.

A third embodiment of the present invention will now be described with reference to FIG. 13. The third embodiment is generally the same as the second embodiment, except that it presents a different method of increasing the rotational speed Ng of the generator when the target load torque Tg* is limited to the maximum transmittable torque value Tslip. As shown in FIG. 13, the load torque limiting processing of the third embodiment is the same as the load torque limiting processing shown in FIG. 11 except that step S41 has been eliminated and steps S44 and S45 have been replaced with the new steps S54 and S55. The steps that are the same as those shown in FIG. 11 are indicated with the same step numbers and descriptions thereof may be omitted for the sake of brevity.

In step S54, the 4WD controller 19 calculates the increase amount Δθ by which the throttle opening needs to be increased in order to increase the engine rotational speed by the increase amount ΔNe; the calculation is based on the increase amount ΔNe.

In step S55, the 4WD controller 19 issues a throttle control command to the engine controller 14 instructing the engine controller 14 to increase the throttle opening θ by the increase amount Δθ.

The steps S42, S43, S54, and S55 of FIG. 13 constitute a rotational speed increasing section.

Thus, with the third embodiment, when the target load torque Tg is limited to the maximum transmittable torque value Tslip, the engine rotational speed Ne and the generator rotational speed Ng are increased by increasing the throttle opening θ of the engine 2. In addition to preventing the belt from slipping, the decline in the output of the generator 7 that would otherwise result from limiting the target load torque can be reliably suppressed. Since the output of the engine 2 can increased freely to the desired degree by adjusting the amount Δθ by which the throttle opening is increased, the output Pg of the generator 7 can be optimized.

In addition to the methods presented in the first to third embodiments, there are still other methods of increasing the rotational speed Ng of the generator 7 when the target load torque Tg* is limited to the transmittable torque Tslip. For example, a belt-driven continuously variable transmission 30 can be installed between the engine 2 and the generator 7 and the generator rotational speed Ng can be increased by changing the gear ratio of the belt-driven continuously variable transmission.

Thus, there are at least four methods of increasing the generator rotational speed Ng: downshifting an automatic transmission 4 to a lower gear ratio; increasing the target slippage ratio S* used for traction control; increasing the throttle opening θ directly; and using a belt-driven continuously variable transmission 30. It is acceptable to use any one of these methods or any combination of these methods in order to increase the generator rotational speed Ng.

As used herein, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

In describing the present invention, the term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2003-348991. The entire disclosure of Japanese Patent Application No. 2003-348991 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A vehicle drive system comprising:
    a main drive source arranged and configured to drive a first wheel;
    an electric generator coupled to the main drive source by a drive belt such that the electric generator is configured and arranged to generate electric power using power transmitted thereto from the main drive source;
    a load torque limiting section configured to selectively limit a load torque that the electric generator imposes on the main drive source to a value at which the drive belt does not slip; and
    a rotational speed increasing section configured to selectively increase a rotational speed of the electric generator when the load torque limiting section limits the load torque of the electric generator.

2. The vehicle drive system as recited in claim 1, wherein the rotational speed increasing section is further configured to increase the rotational speed of the electric generator in accordance with an amount by which the load torque limiting section limits the load torque.

3. The vehicle drive system as recited in claim 2, further comprising
    a transmission installed between the main drive source and the first wheel driven by the main drive source, and the rotational speed increasing section being further configured to increase the rotational speed of the electric generator by shifting the transmission to a lower gear ratio.

4. The vehicle drive system as recited in claim 2, wherein the rotational speed increasing section is further configured to increase the rotational speed of the electric generator by increasing a throttle opening of the main drive source to increase the rotational speed of the main drive source.

5. The vehicle drive system as recited in claim 2, further comprising
a traction control section configured to limit a degree of acceleration slippage of the first wheel driven by the main drive source to a value equal to or less than a target value by limiting an output of the main drive source when acceleration slippage of the first wheel is detected, and
the rotational speed increasing section being further configured to increase the rotational speed of the electric generator by increasing the target value.

6. The vehicle drive system as recited in claim 2, further comprising
a load torque control section configured to control the load torque of the electric generator in accordance with the degree of acceleration slippage of the first wheel driven by the main drive source when the first wheel undergo acceleration slippage.

7. The vehicle drive system as recited in claim 5, further comprising
a load torque control section configured to control the load torque of the electric generator in accordance with the degree of acceleration slippage of the first wheel driven by the main drive source when the first wheel undergo acceleration slippage, and
the traction control section being further configured to limit an output of the main drive source when the load torque limiting section limits the load torque of the electric generator while the load torque of the electric generator is being controlled by the load torque control section.

8. The vehicle drive system as recited in claim 2, further comprising
an electric drive device configured and arranged to be driven by electric power generated by the electric generator, and the electric drive device being further configured and arranged to drive a second wheel that is not mechanically driven by the main drive source.

9. The vehicle drive system as recited in claim 1, wherein the rotational speed increasing section being further configured to increase the rotational speed of the electric generator by shifting a transmission to a lower gear ratio.

10. The vehicle drive system as recited in claim 1, wherein
the rotational speed increasing section is further configured to increase the rotational speed of the electric generator by increasing a throttle opening of the main drive source to increase the rotational speed of the main drive source.

11. The vehicle drive system as recited in claim 1, further comprising
a traction control section configured to limit a degree of acceleration slippage of the first wheel driven by the main drive source to a value equal to or less than a target value by limiting an output of the main drive source when acceleration slippage of the first wheel is detected, and
the rotational speed increasing section being further configured to increase the rotational speed of the electric generator by increasing the target value.

12. The vehicle drive system as recited in claim 1, further comprising
a load torque control section configured to control the load torque of the electric generator in accordance with the degree of acceleration slippage of the first wheel driven by the main drive source when the first wheel undergo acceleration slippage.

13. The vehicle drive system as recited in claim 11, further comprising
a load torque control section configured to control the load torque of the electric generator in accordance with the degree of acceleration slippage of the first wheel driven by the main drive source when the first wheel undergo acceleration slippage, and
the traction control section being further configured to limit an output of the main drive source when the load torque limiting section limits the load torque of the electric generator while the load torque of the electric generator is being controlled by the load torque control section.

14. The vehicle drive system as recited in claim 1, further comprising
an electric drive device configured and arranged to be driven by electric power generated by the electric generator, and the electric drive device being further configured and arranged to drive a second wheel that is not mechanically driven by the main drive source.

15. A vehicle drive system comprising: a main drive source, an electric generator coupled to the main drive source by belt to generate electric power.
load torque limiting means for selectively limiting a load torque that an electric generator imposes on a main drive source to a value at which a drive belt between the electric generator and the main drive source does not slip; and
rotational speed increasing means for selectively increasing a rotational speed of the electric generator when the load torque limiting means limits the load torque of the electric generator.

16. A vehicle electric power generation control device comprising:
a load torque limiting section configured to selectively limit a load torque that an electric generator imposes on a main drive source to a value at which a drive belt between the electric generator and the main drive source does not slip; and
a rotational speed increasing section configured to control a rotational speed outputted by the main drive source to the generator so as to selectively increase a rotational speed of the electric generator when the load torque limiting section limits the load torque of the electric generator.

17. The vehicle electric power generation control device as recited in claim 16, wherein
the rotational speed increasing section is further configured to increase the rotational speed of the electric generator in accordance with an amount by which the load torque limiting section limits the load torque.

18. The vehicle electric power generation control device as recited in claim 16, wherein the rotational speed increasing section being further configured to increase the rotational speed of the electric generator by shifting a transmission to a lower gear ratio.

19. The vehicle electric power generation control device as recited in claim 16, wherein
the rotational speed increasing section is further configured to increase the rotational speed of the electric generator by increasing a throttle opening of the main drive source to increase the rotational speed of the main drive source.

20. The vehicle electric power generation control device as recited in claim 16, further comprising
a traction control section configured to limit a degree of acceleration slippage of a first wheel driven by the main drive source to a value equal to or less than a target value by limiting an output of the main drive source when acceleration slippage of the first wheel is detected, and
the rotational speed increasing section being further configured to increase the rotational speed of the electric generator by increasing the target value.

21. The vehicle electric power generation control device as recited in claim 16, further comprising
a load torque control section configured to control the load torque of the electric generator in accordance with a degree of acceleration slippage of a first wheel driven by the main drive source when the first wheel undergo acceleration slippage.

22. The vehicle electric power generation control device as recited in claim 20, further comprising
a load torque control section configured to control the load torque of the electric generator in accordance with the degree of acceleration slippage of the first wheel driven by the main drive source when the first wheel undergo acceleration slippage, and
the traction control section being further configured to limit an output of the main drive source when the load torque limiting section limits the load torque of the electric generator while the load torque of the electric generator is being controlled by the load torque control section.

* * * * *